March 15, 1960     W. C. STEPHEN     2,928,488
TEMPORARY IGNITION DISABLING MEANS
Filed Jan. 22, 1957     2 Sheets-Sheet 1
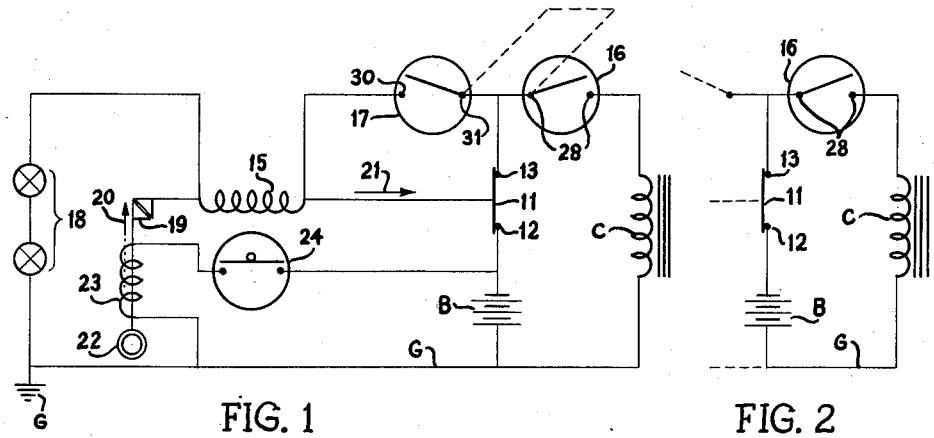
FIG. 1     FIG. 2
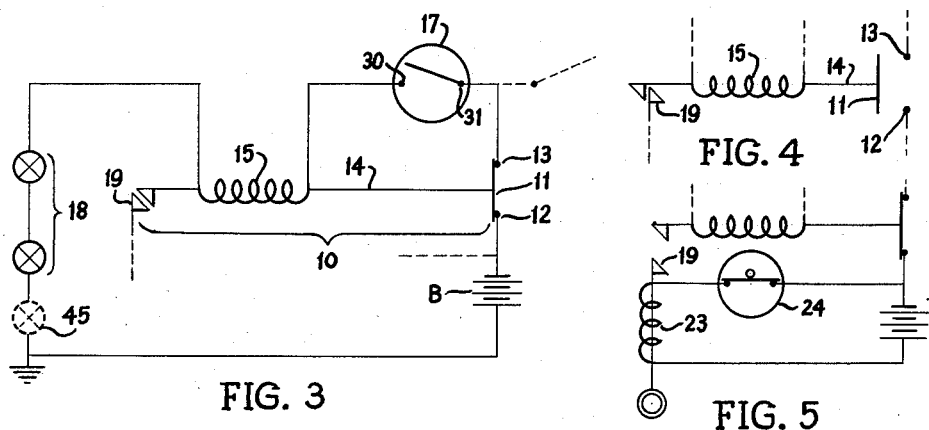
FIG. 3     FIG. 4
FIG. 5
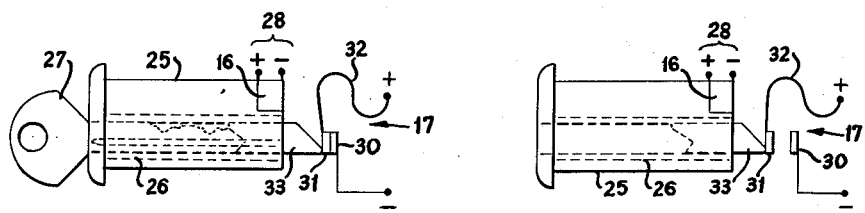
FIG. 6     FIG. 7
Inventor
WILLIAM C. STEPHEN
By: *Leon Arthurs* - agent March 15, 1960   W. C. STEPHEN   2,928,488
TEMPORARY IGNITION DISABLING MEANS
Filed Jan. 22, 1957   2 Sheets-Sheet 2

Inventor
WILLIAM C. STEPHEN
By: *Leon Arthurs* - agent

United States Patent Office 2,928,488
Patented Mar. 15, 1960

2,928,488

TEMPORARY IGNITION DISABLING MEANS

William Clark Stephen, Toronto, Ontario, Canada

Application January 22, 1957, Serial No. 635,343

8 Claims. (Cl. 180—82)

The invention relates to means for preventing or at least hindering the unauthorized use of a motor or motor device, such as an automobile, directly or indirectly powered, at least in part, by electricity.

It is a common tendency on the part of motorists to leave their vehicles with the ignition key in its lock; thereby encouraging the taking of such vehicles by unauthorized persons.

The invention therefore proposes to provide a protective device comprising means for disabling the ignition system of the motor vehicle at such times; the system being thereafter restorable by separately guarded means capable of being more or less physically isolated from the standard ignition lock.

In addition, the invention also seeks to provide such means which will function irrespective of whether or not the motor is left running. That is to say, if the automobile is left with the motor running, the present protective device will operate to cut it off and to keep it cut off until the ignition system is restored.

A more specific object of the invention is to provide electrically actuated disabling means which automatically isolates itself from the automobile battery as soon as the system has been disabled so that no current is required or drawn to maintain such disablement.

Figure 8:
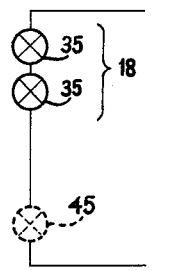

Further and other objects of the invention, more or less broad than the foregoing will become apparent from the hereinafter following description of the elements, parts and principles constituting the invention; a preferred embodiment thereof being illustrated by way of example only in the annexed drawing wherein like reference devices denote like parts of the invention throughout the several views and wherein:

Fig. 1 is a schematic composite of three electrical circuits which co-operate to produce the results contemplated by the invention Figs. 2, 3, 4 and 5 are separate schematic views of the said circuits Fig. 6 is a transparent view of an ignition lock as contemplated by the invention with its key in place Fig. 7 is a view similar to that of Fig. 6 showing the lock with the key removed Fig. 8 is a modified detail of the circuit of Fig. 3

Figure 9:
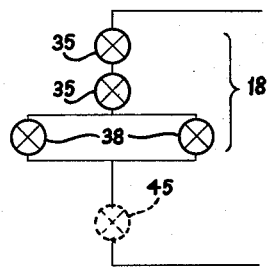
Figure 10:
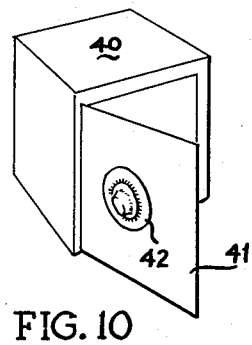
Figure 11:
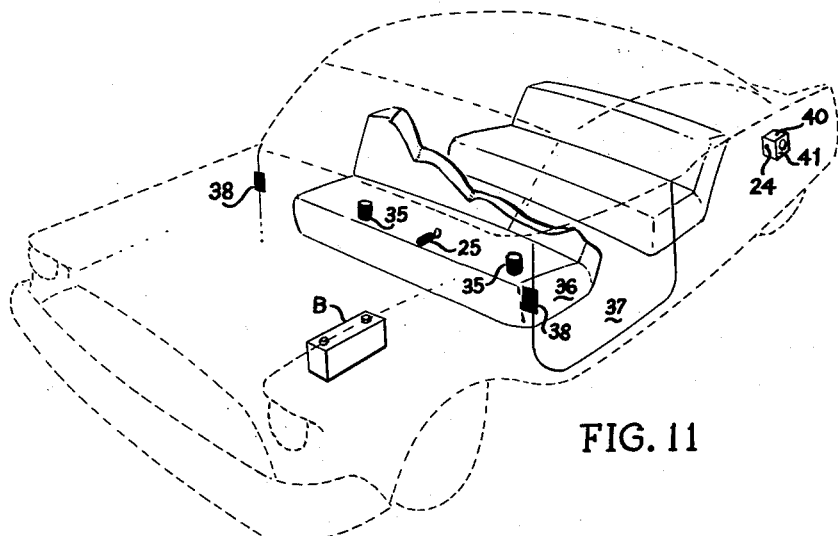

Fig. 9 is a view of the detail shown in Fig. 8 containing a further modification Fig. 10 is an isometric view of a strong box or vault as contemplated by the invention, and Fig. 11 is a transparent view of an automobile showing proposed locations for the several parts of the invention.

The specific means herein contemplated for disabling the ignition system is a circuit breaker which may be of the electro-magnetic type selected for the exemplary purposes of this disclosure and indicated schematically at 10 in Fig. 3. This instrumentality is a, so-called, latching relay which is biassed to the closed or circuit-making position of Figs. 1, 3 and 5 wherein its bridge 11 electrically interconnects the live or battery contact 12 and the load contact 13; both of which are carried by the relay 10.

The latching relay 10 has an armature 14 and a solenoid 15 which latter, upon energization is adapted to draw the armature 14 and the bridge 11 into the circuit-breaking position of Fig. 4 wherein the electrical connection between contacts 12 and 13 is opened, thus de-polarizing the latter contact.

In the circuit of Fig. 2, which is herein distinguished as the "main" circuit, there are included the conventional ignition switch 16 and the ignition coil C interconnected in series between the load contact 12 and ground G.

It need hardly be mentioned that one terminal of the Battery B is electrically connected to Ground G while the other is disconnectibly connected through live contact 12 and bridge 11 to load contact 13.

In the branch circuit of Fig. 3, there are included a tripper switch 17, the solenoid 15, and a bank 18 of auxiliary switches all connected in series between load contact 13 and ground G.

It will thus be seen that tripper switch 17 and the switch bank 18 must be closed before the solenoid 15 can be energized to procure the breaking of the circuit across contacts 12 and 13.

When this occurs, the relay armature 14 is drawn into the position of Fig. 4 wherein it is captured by latch 19 and mechanically retained thereby, being thus prevented from re-making the connection between contacts 12 and 13 until released by means hereinafter described.

At this point, both the main and branch circuits of Figs. 1 and 2 have been electrically extinguished; the load contact 13 having been rendered inert.

As shown in Fig. 5 the latch 19 is movable against the bias indicated by arrow 20 to release the armature 14 which is biassed as indicated by arrow 21 to move back to circuit making position; the biassing arrows 20—21 appearing in Fig. 1.

Latch 19 may be moved manually (which ring 22 at its end is intended to indicate) or it may be moved magnetically by the energization of coil 23 connected through the push switch 24 across the battery B; said push switch 24 being normally open as in Fig. 1.

An important element in the invention is the ignition lock 25 illustrated in Figs. 6 and 7. This is a more or less conventional element having a plug 26 shown in dotted lines which is rotatable by the appropriate key 27 to electrically interconnect terminals 28—28 which are included in switch 16 shown schematically in Figs. 1 and 2.

The tripper switch 17 of Figs. 1 and 3 is located at the rear of the plug 26 and includes a stationary contact 30 and a movable contact 31 at the end of a spring 32 by which it is biassed away from stationary contact 30 towards plug 26.

Within the keyway of plug 26 there is a driver 33 which may be pushed ahead out of the plug 26 by key 27 or pushed back in by spring 32. When the key 27 is pushed home in the plug 26, the driver 33 will be expressed to drive the spring 32 towards stationary contact 30 and to close movable contact 31 thereto. When the key 27 is removed the spring 32 will procure the re-opening of contacts 30—31; pushing the driver 33 back into the plug 26.

Thus the mere insertion of the key 27 into the ignition lock 25 will close tripper switch 17 to cock the branch circuit of Figs. 1 and 3.

In this embodiment, the switch bank 18 included in the branch circuit of Figs. 1 and 3, may comprise one or more auxiliary switches which are very similar to push switch 24 except that they are biased to a closed rather than an open inclination. These auxiliary switches may be distributed about the automobile of Fig. 11 in any of several ways.

If only one auxiliary switch is used, it may be located as shown at 35 in association with the driver's seat 36; said auxiliary switch 35 being arranged to be opened by the weight of the driver on the seat 36. This auxiliary switch 35 therefore closes when the driver leaves seat 36. If the key 27 is left in the ignition lock 25 when the seat 36 is vacated, auxiliary switch 35 will complete the circuit to the solenoid 15 and procure the disconnection of contacts 12 and 13 as previously indicated, thus disabling the main or ignition circuit. Of course, if the key 27 is removed when the driver leaves seat 36, the closing of auxiliary switch 35 will have no effect whatsoever.

If auxiliary switches 35 are coupled to every seat in the automobile (herein shown as two in number), they are arranged in series as shown in Fig. 8 whereby the circuit to the solenoid 15 will not be completed until every seat is vacated.

A still further arrangement of auxiliary switches in bank 18 is shown in Fig. 9 wherein, the seat switches 35—35 are wired in series with each other and with a group of door switches 38 which are wired to parallel each other. In this scheme, the solenoid 15 cannot be energized unless and until all seats are vacated and at least one door 37 opened for the departure of the occupant or the last occupant.

A preferred location for the push button switch 24 is in vault 40, accessible only through trap-door 41 on the exterior of the automobile as shown in Fig. 9. Ideally, this trap-door 41 should be guarded by combination lock 42, thus dispensing with the necessity for another key.

The optional switch 45 shown for example in dotted lines in Figs. 3, 8, and 9 is a standard two-position switch capable of being fixed either closed or open; having no inherent bias towards either position.

This optional switch 45 may be included in the branch circuit of Fig. 3 to disable it temporarily when, for some reason or other, it is necessary or desirable to leave the vehicle unattended with the key 27 in lock 25.

A situation of this nature may arise, for example, when a series of deliveries are to be made from the vehicle and it is preferred to leave the motor running instead of re-starting it each time the driver returns to the vehicle.

The vault 40, which houses the push switch 24, may also contain another ignition key 27 for use in the event that the driver has locked his keys inside the vehicle.

What I claim as my invention is:

1. In an automotive vehicle, an ignition device in a main circuit with a source of electrical energy and with a lock and key operated ignition switch, a bridge biassed to make said main circuit; an armature associated with said bridge and adapted to carry it between circuit making and circuit breaking positions; an electrically energizable element adapted to act on said armature for procuring the movement of the said bridge into circuit breaking position; a branch circuit communicating between said main circuit and said electrically energizable element; a latch operable upon the movement of the bridge into circuit-breaking position to releasably restrain the bridge from returning to circuit making position; means for procuring the release of said latch and permitting the return of the bridge to its circuit-making position; a control switch included in said branch circuit disposed to be closed upon the insertion of a key into the ignition switch lock to connect said branch circuit to said main circuit and to be re-opened upon the withdrawal of the said key to disconnect said branch circuit from said main circuit and at least one other switch included in said branch circuit which is operable by the movements of the attendant of said automotive vehicle.

2. The device set forth in claim 1 wherein the said bridge releasing means is, itself, operable by electrical energy and is directly connected through a switch to said source of electrical energy by a circuit which is independent of said main circuit.

3. The device set forth in claim 1 wherein the said bridge releasing means is, itself, operable by electrical energy and is directly connected through a switch to said source of electrical energy by a circuit which is independent of said main circuit; said switch being accessible from the exterior of said automotive vehicle.

4. The device set forth in claim 1 wherein the said bridge releasing means is, itself, operable by electrical energy and is directly connected through a switch to said source of electrical energy by a circuit which is independent of said main circuit; said switch being contained in a vault which is accessible from the exterior of said automotive vehicle.

5. Means for temporarily disabling an electrically powered device in a main circuit with a source of electrical energy and with a lock and key operated main switch; said disabling means being operable when the said device is left unattended with the key in the said lock and comprising, a relay which normally makes said main circuit; an element associated therewith which is electrically energizable to move said relay to procure the breaking of said circuit; a latch for said relay operable upon the breaking of said main circuit, to temporarily prevent the remaking thereof; means for releasing said latch to permit said relay to remake said main circuit, and a branch circuit communicating between said main circuit and said element; a switch for controlling said branch circuit and at least one other switch included in said branch circuit, said controlling switch being associated with the lock operating the main switch and being closable by the insertion of a key into the said lock rendering said branch circuit responsive to said other switch and re-openable upon the withdrawal of said key rendering said branch circuit unresponsive to said other switch, said other switch being closable, at least momentarily, by an attendant.

6. In an automotive vehicle having seats and an ignition device in a main circuit with a source of electrical energy and with a lock and key operated ignition switch, means for temporarily disabling said automotive vehicle upon being left by its attendant with the key in the said lock comprising, a relay which normally makes said main circuit; an element associated therewith which is electrically energizable to move said relay to procure the breaking of said circuit; a latch for said relay, operable upon the breaking thereof, for temporarily preventing the re-making of said main circuit; means for releasing said latch to permit said relay to remake said main circuit and, a branch circuit communicating between said main circuit and said element; a switch for controlling said branch circuit and at least one other switch included in said branch circuit, said controlling switch being associated with the lock operating the ignition switch and being closable by the insertion of a key into the lock rendering said branch circuit responsive to said other switch and re-openable upon the withdrawal of the said key rendering said branch circuit unresponsive to said other switch, the other said switch being associated with one of the seats in the said automotive vehicle to open when the said seat is occupied and to close when it is vacated by the said attendant.

7. In an automotive vehicle having seats and an ignition device in a main circuit with a source of electrical energy and with a lock and key operated ignition switch, means for temporarily disabling said automotive vehicle upon being left by its attendant with the key in the said lock comprising, a relay which normally makes said main circuit; an element associated therewith which is electrically energizable to move said relay to procure the breaking of said main circuit; a latch for said relay operable upon the breaking of said main circuit to temporarily prevent the remaking thereof; means for releasing said latch to permit said relay to remake said main circuit and, a branch circuit communicating between said main circuit and said element; a switch for controlling said branch circuit and associated with the ignition lock and being closable upon the insertion of a key into the lock to connect said branch circuit to said main circuit and re-openable upon the withdrawal of said key to disconnect said branch circuit from said main circuit and, a group of auixliary switches also included in and forming part of said branch circuit, some of said auxiliary switches being associated with the seats in said automotive vehicle to open when one or more of the said seats are occupied and to close when they are vacated, and others of said auxiliary switches being associated with one or more of the doors of said automotive vehicles to close when one or another of said doors is open and to be opened when said doors are closed whereby the vacating of said seats and the opening of one or more of said doors will complete said branch circuit and thereby procure the disablement of said main circuit.

8. In an automotive vehicle, an ignition device in a main circuit with a source of electrical energy and with a lock and key operated ignition switch, a bridge biassed to make said main circuit; an armature associated with said bridge and adapted to carry it between circuit making and circuit breaking positions; an electrically energizable element adapted to act on said armature for procuring movement of the said bridge into circuit breaking position; a branch circuit communicating between said main circuit and said electrically energizable element; a control switch included in said branch circuit disposed to be closed upon the insertion of a key into said ignition switch lock to connect said branch circuit to said main circuit and to be re-opened upon the withdrawal of said key to disconnect said branch circuit from said main circuit, and at least one other switch included in said branch circuit which is operable by the movements of the attendant of said automotive vehicle; a latch operable upon the movement of said bridge into circuit-breaking position to releasably restrain the bridge from returning to circuit making position; electrically operable means for procuring the release of said latch and permitting the return of the bridge to its circuit-making position; said means being directly connected through a switch to said source of electrical energy by a circuit which is independent of said main circuit; said switch being contained in a vault which is accessible from the exterior of said automotive vehicle, and is protected by a combination lock.

References Cited in the file of this patent

UNITED STATES PATENTS

| | | |
|---|---|---|
| 1,998,990 | Hasselbaum | Apr. 23, 1935 |
| 2,105,350 | Fitzgerald | Jan. 11, 1938 |
| 2,162,567 | Shobel et al. | June 13, 1939 |
| 2,360,227 | Hemphill | Oct. 10, 1944 |
| 2,515,044 | Kappel | July 11, 1950 |
| 2,535,366 | Mead | Dec. 26, 1950 |